March 23, 1965  R. C. MORGAN  3,174,247
FISHING TACKLE

Filed July 25, 1962  2 Sheets-Sheet 1

Robert Charles Morgan
INVENTOR.

BY *[signatures]*
Attorneys

March 23, 1965 — R. C. MORGAN — 3,174,247
FISHING TACKLE

Filed July 25, 1962 — 2 Sheets-Sheet 2

Robert Charles Morgan
INVENTOR.

United States Patent Office 3,174,247
Patented Mar. 23, 1965

3,174,247
FISHING TACKLE
Robert Charles Morgan, 1310 S. Quincy St.,
Topeka, Kans.
Filed July 25, 1962, Ser. No. 212,195
5 Claims. (Cl. 43—15)

The present invention relates to fishing tackle which is such in construction that it may be used when trolling, may also be used while still fishing, and may also be hand-cast from a bank or wharf into a flowing stream with good results.

One object of the present invention is to provide pull responsive fishhook setting tackle characterized by an elongated barrel having a closed upper end equipped with a suitable float and a specially constructed lower end, said barrel protectively enclosing a cooperating end portion of a guidingly mounted spring loaded shaft. The median portion of the shaft is slidingly mounted in the bore of a guide sleeve. The lower end portion of said shaft is connected through a yoke or frame to a trailing chain-like leader, the latter made up of a plurality of companion rigid but flexibly interconnected links.

The invention also features a cup-type spinner having a central hub mounted for rotation on the aforementioned sleeve, said sleeve serving as a journal for the hub portion of the spinner. The upper end of the frame is provided with a clutch element and the hub portion has an oriented clutch element. These cooperating clutch elements are spring biased into engagement in a manner to positively transmit rotary action to the leader through the medium of said frame, whereby the spinner and leader conjointly provide an animated fish lure when trolled through the water with a degree of action sufficient to turn the spinner.

Another object is to provide a construction and arrangement which permits the spinner to idle or turn freely, that is, when a fish is caught and continues to exert a pull on the chain-like leader, shaft and spinner assembly. After the fish is caught and sufficient pull is exerted on the spring-loaded shaft the spinner is then free to idle with the result that objectionable back pull and drag on the line is prevented.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
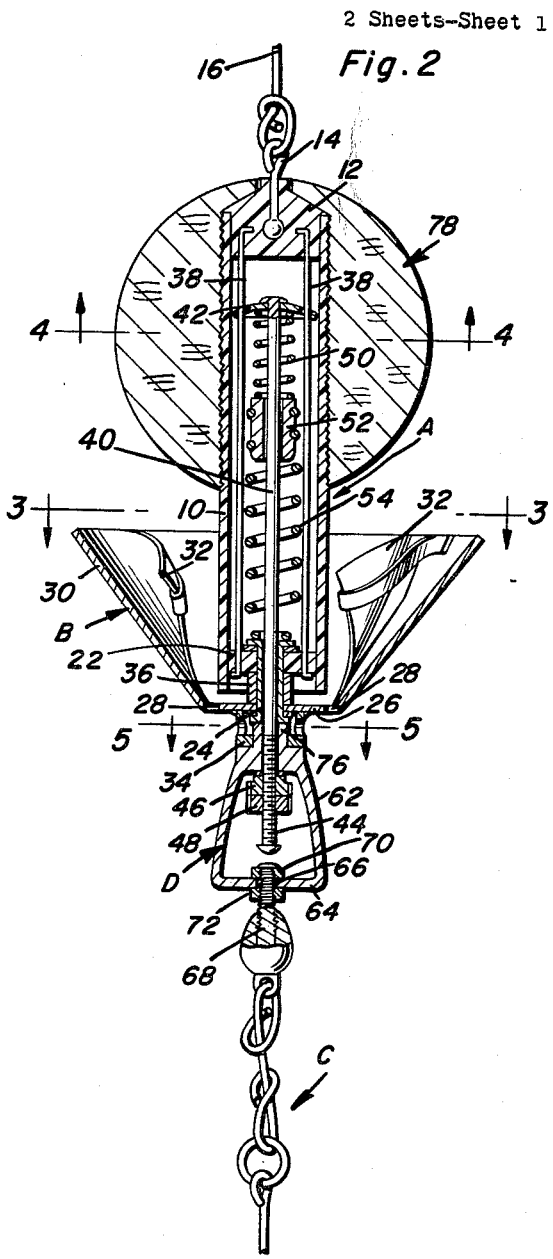
FIGURE 2 is a view on an enlarged scale with parts appearing in section and elevation taken on the plane of the vertical section line 2—2 of FIG. 1.
Figure 3:
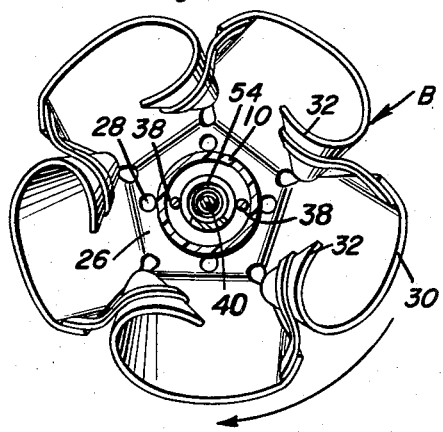
Figure 6:
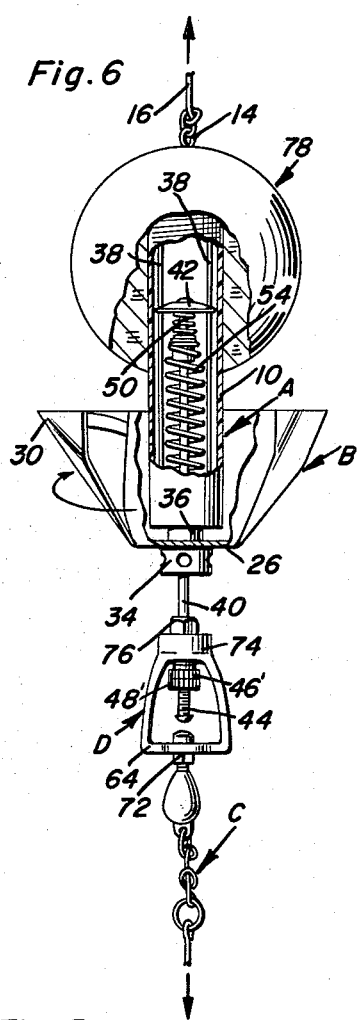
Figure 4:
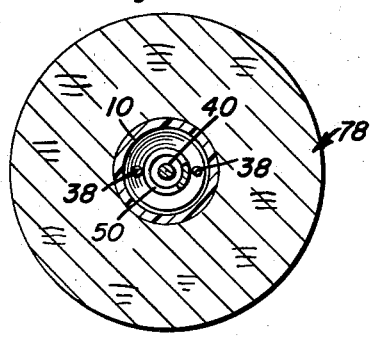
Figure 5:
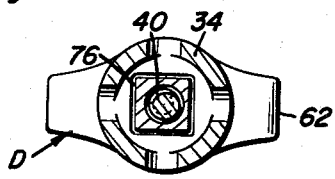
Figure 7:
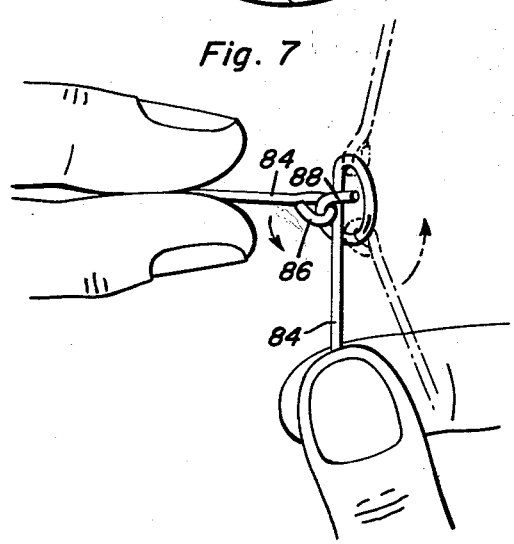

FIGURES 3, 4, and 5 are sections taken on the horizontal section lines 3—3, 4—4 and 5—5, respectively, of FIG. 2;

FIGURE 6 is a view similar to FIG. 2 showing the clutch and clutching action; and FIGURE 7 is an enlarged view in perspective showing separably connected component parts of the chain-like leader.

The pull-actuated spring-loaded fish catching or hook-setting means is denoted by the reference character A. It comprises an elongated transparent barrel or cylinder 10 having a plug 12 anchored in the upper end of the cylinder as shown in FIG. 2. This plug is provided with an eye 14 to which a link 16 is releasably connected said link having an eye which is joined to a coupling ring 18 (FIG. 1) which functions to accommodate the fishing line 20. A washer 22 (FIG. 2) is friction-fitted or otherwise anchored in the lower end of the cylinder and is centrally apertured to accommodate the adjacent flanged end of a guide sleeve 24. It will be noted that the lower end of the bushing is also flanged and projects below the washer and cylinder and also constitutes a journal for the flat disk-like hub portion 26 of the bladed rotor, also referred to as a cup-like spinner B. It is to be noted that the hub portion is provided with water orifices or holes 28 and that the upwardly and outwardly flaring rim portion 30 is provided with appropriately bent portions defining circumferentially spaced fins or wings 32 which cooperate with each other to facilitate the spinning or rotating step. The hub portion is provided on its bottom side with a depending rigid ported collar 34 which collar provides the female component of a clutch. With further reference to FIG. 2 the numeral 36 designates a spacing ring which is interposed between the hub 26 and washer 22 and which surrounds the bushing or sleeve 24. The flanged lower end of the sleeve 24 and spacing ring 36 serve to provide a journal which, when the spinner or cup is declutched, permits free spinning of the cup or spinner B. Diametrically oppositely located guide rods 38 are anchored in the plug 12 at their upper ends and the lower ends thereof are suitably clenched and anchored on the aforementioned washer 22. A rod or shaft 40 has its upper end fixedly connected to a sliding disk or guide 42 which is keyed and therefore slidable along the supporting and guide rods 38. It will be noted that the lower end portion of the shaft is headed and screw-threaded as denoted at 44 the screw-threads serving to accommodate the complemental adjusting nuts 46 and 48. A first lightweight coil spring 50 surrounds the upper portion of the shaft 40 and is suitably anchored at its lower end on a sleeve 52 located at the lower end of the spring and also surrounding the shaft. A second and somewhat stronger coil spring 54 surrounds said shaft and the upper convolution abuts the spring anchoring sleeve 52 while the lower convolution rests atop the flanged guide sleeve or bushing 24.

Figure 1:
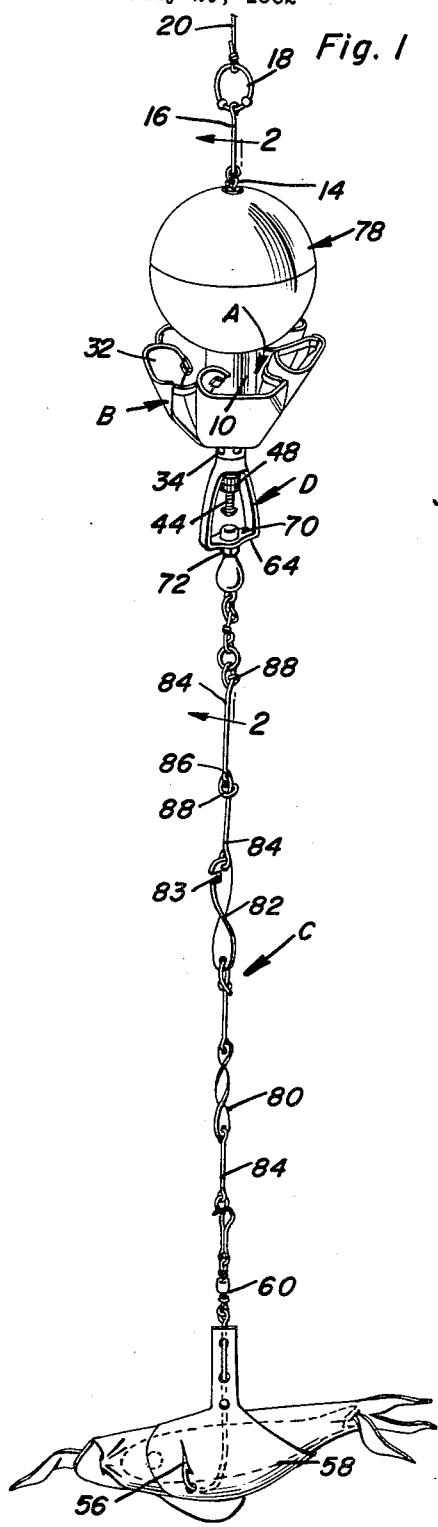
FIGURE 1 is a view in perspective of a fish catching device constructed in accordance with the present invention and showing the same baited.

With reference now to the aforementioned chain-type leader this is denoted generally by the letter C. The free or lower end of the leader is provided with a fishhook 56 or equivalent means carrying an appropriate sling or jacket 58 in which the bait (live minnow or the like) is jacketed and held. The fishhook is swivelly connected to an adjacent component portion of the leader as denoted generally at 60. The upper end portion of the leader is connectible to a coupling frame or yoke which is generally denoted at D. This part D comprises a generally trapezoidal frame 62 the lower member or bar of which 64 is provided with a hole 66 to accommodate the upper screw-threaded end of a connecting bolt 68. The bolt has a nut 70 at the top and another complemental nut 72 and these two nuts are arranged above and below the frame bar 64 and they can either be tightened to positively connect the bolt with the frame or they may be loosened to allow the bolt to swivel relative to the frame. Therefore, the upper end of the lure leader is adjustably connectible with the frame. The upper end 74 of the frame (FIG. 6) is provided with a reduced integral extension providing a nut-shaped lug 76 which constitutes the male component of the clutch. By properly adjusting the nuts 46 and 48 on the threaded portion 44 of the shaft or rod the lug 76 is projected into the collar or female clutch part and thus the clutch as an entity serves to connect the leader C to the cup B by way of the linking yoke or frame D. This action is obtained by the normal tendency of the springs 54 and 50 to exert an upward thrust on the disk 42. This coaction of the parts serves to slide the disk up on the rods 38 thus retracting the shaft in a spring biased state within the cylinder or barrel 10. With the parts in the relationship shown in FIGS. 1 and 2 the clutch is engaged and consequently the spring-loaded catching and hook-setting device A assumes the set position shown in FIG. 2. Assuming now that the leader C is properly baited as shown in FIG. 1 it will be evident that when the victim fish strikes the bait and hook and exerts a pull in a direction presumably away from the angler and with the angler holding the line 20 and exerting a pull in the opposite direction, the frame D is declutched and a bladed rotor B is then free to swivel or rotate on the journal sleeve 24. Primarily, however, the light spring 50 is compressed and then if a more severe pull is exerted on the leader by the fish or by the pull on the fishing line, the stronger spring 54 comes into play and with both springs compressed it will be seen that a spring return force is set up which is quick and, as a result of this action, the fishhook can be reliably set in the mouth of the fish.

Assuming that the nuts 70 and 72 are loose with respect to the intervening frame bar 64 a swivel connection between the frame D and leader C will be had thus allowing the leader to rotate freely and also its component parts to flex and swing independently in various directions for attraction purposes. The device A is preferably suspended in the water by way of a float which also constitutes a bobber and which is preferably a ball-like construction, said float being denoted at 78. The float is mounted on the upper half-portion of the cylinder or barrel and the lower half-portion normally projects into the receptacle portion of the bladed rotor or spinner B. When the spinner B is clutched (FIG. 2) to the spring device it becomes a sort of an impeller for turning the spring device including the float and also the yoke and depending on whether the leader C is swivelled to the yoke, it would have a twirling action on the leader C. If the leader is purposely adjusted to swivel it will turn by itself.

The leader is preferably active and durable in that it is preferably made up of a suitable number of end-to-end separably connected links. Certain of the links, those denoted at 80, are of twisted blade form and facilitate imparting rotation to the leader as an entity. One of these twisted blades, the one shown at 82, may be provided if desired with a notch 83 which constitutes a wrench and which is of a size to engage the available binding nuts 48 and 46 as shown, for example, in FIG. 2 in particular. This obviates the necessity of having to have a special wrench on hand to loosen and tighten these nuts. Alternately, the notch 83 may be shaped to conform with the nuts 46' and 48' which are shown in FIG. 6 to be knurled. As to the other links these are generally designated as straight wires or wire members 84 each of which is preferably provided with an eye 86 at one end which is separably connectible with specially bent coupling or connecting means 88. Accordingly, there is means 88 at one end and eye at the other end and these parts cooperate normally in the assembled relationship shown in FIG. 1 or they may be angled between the fingers and separated as shown in FIG. 7. Therefore, by making the leader C of metal separable components it is strong and durable, is highly active and serves the purposes for which it is intended particularly when fishing for large game fish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fish catching and pull responsive hook setting device comprising: an elongated barrel adapted to be vertically disposed, a spring loaded shaft having a portion thereof slidingly confined in said barrel, a leader, a float attached to and carried by said barrel, said barrel being provided at its lower end with a sleeve providing a guide bushing, a median portion of said shaft being slidingly operable in said bushing, said sleeve also providing a journal, a spinner embodying a cup-like member having circumferentially spaced impeller blades axially provided with a hub portion mounted for rotation on said journal, said hub portion being provided with an axially fixed depending collar embodying a clutch element, and a leader linking frame having an upper end provided with a clutch element normally engaged with the first-named clutch element, said leader having an upper portion connected to said linking frame.

2. The structure defined in claim 1 and wherein said leader comprises a plurality of complemental rigid links, said links being separably connected and certain of said links having twisted portions to impart rotation thereto and also the entire leader.

3. A fishing device comprising an elongated cylindrical barrel adapted to be vertically disposed, said barrel having closed upper and lower ends and being provided at said lower end with an axially positioned sleeve constituting a shaft bearing and also a journal, longitudinally disposed guide rods fixed in said barrel, a shaft having a major portion thereof slidingly confined in said barrel and a median portion slidable in said shaft bearing and provided at an upper end with a fixed guide slidable on said guide rods, a first coil spring encircling said shaft and bearing at one end against the lower closed end portion of said barrel, a second coil spring also encircling said shaft and bearing at one end against said fixed guide, said first coil spring being of a strength appreciably greater than the strength of the second coil spring, and a leader operatively connected with said shaft.

4. The structure defined in claim 3 and in combination, a cup-shaped spinner having a hub portion encircling the journal portion of said sleeve, said hub portion being provided with an axially depending female clutch element, a yoke having an upper end portion embracing and mounted on said shaft and having a male clutch element projecting into said female element and normally connected thereto and held in said normal connected relationship by the action of the aforementioned springs.

5. The structure defined in claim 4 and wherein said leader is provided at an upper end with adjustable connecting means joined to a cooperating lower end of said yoke, whereby said leader may be made to pivot with respect thereto.

References Cited by the Examiner

UNITED STATES PATENTS

| | | | |
|---|---|---|---|
| 582,677 | 5/97 | Parker | 43—42.19 X |
| 608,063 | 7/98 | Mintzer | 43—15 |
| 1,427,147 | 8/22 | Barsch | 43—42.16 X |
| 1,530,343 | 3/25 | Bayer | 43—42.2 |
| 1,782,204 | 11/30 | Jensen | 43—42.17 |
| 1,903,863 | 4/33 | Hayden | 287—20 |
| 2,530,007 | 11/50 | Euzent | 43—15 |
| 2,758,440 | 8/56 | Magid | 59—95 |

FOREIGN PATENTS 2,194 1904 Great Britain.

ABRAHAM G. STONE, *Primary Examiner.*

JOSEPH S. REICH, *Examiner.*